UNITED STATES PATENT OFFICE.

FREDERIC E. IVES, OF PHILADELPHIA, PENNSYLVANIA.

COLOR PHOTOGRAPH OR FILM AND METHOD OF PRODUCING SAME.

1,188,939. Specification of Letters Patent. Patented June 27, 1916.

Application filed December 14, 1915. Serial No. 66,839.

*To all whom it may concern:*

Be it known that I, FREDERIC EUGENE IVES, a citizen of the United States, residing at Philadelphia, in the county of Philadelphia and State of Pennsylvania, have invented certain new and useful Improvements in Color Photographs or Films and Methods of Producing Same, of which the following is a specification, reference being had thereto in the accompanying drawing.

This invention relates to color photographs or films and method of producing same.

The particular field to which the invention is directed is the making of motion picture films in color, but as each separate picture, made under the general principles of color photography, is complete in itself and capable of employment as a picture or print apart from motion picture purposes, the invention has a broad as well as a specific aspect.

In its broad aspect, related to the art of color photography, the object of the invention is to afford a simple and convenient color photograph or multi-color print and the method of producing the same.

With relation to the subject of color motion pictures the object of the invention is to secure a satisfactory film free from certain existing difficulties and objections. It will be understood that the color motion picture film will preferably be in the form of a strip containing a series of pictures, preferably transparent, and the main object of the invention in this aspect is to afford a single series of complete pictures, preferably transparent, each combining all of the necessary colors and thus securing adaptability of the film to ordinary motion picture apparatus. Such heretofore attempted expedients as double or triple series of pictures, or a single series having successive images representing alternating colors, or revolving multi-color shutters, are done away with by the present invention.

On account of the need of winding the film strips upon reels, it is highly objectionable to build up the film by separately producing and then attaching the components, and an object of this invention is to preclude such objections and to permit the several colors to be produced or combined and blended within a single layer of gelatin or analogous material. Thus, a motion picture strip having the usual transparent celluloid base, for giving it strength, and a coating of gelatin or the like, for containing the pictures, may be made to serve for the present purposes without the employment or the attachment of further or other films, or strips, or layers.

It has already been suggested by me that two colors may be combined in such a coating of gelatin, but the present invention goes further and meets the proposition of satisfactorily combining in the single layer the three colors such as blue-green, red and yellow of the three-color system of color photography.

The problem thus presented is to introduce each of the three images of different colors into the film or coating in an efficient and accurate manner, and to so introduce the three of them successively that the presence of none of them will interfere with the proper introduction of the subsequent ones, and such that the introduction of none of them will weaken, diffuse or otherwise injure or destroy the previously introduced images. The present invention accomplishes this result by a harmonious and orderly selection and arrangement of procedures and steps, each complete and operative in itself, and each coöperating with the others to afford as a combined result a complete and practical process resulting in an accurate and satisfactory color motion picture film or color photopraphy print, as the case may be.

To the attainment of the above referred to objects the present invention consists in the novel processes, steps, products and other features hereinafter described.

First will be described one or more embodiments of the invention and thereafter the novel features will be pointed out in the claims.

Two or more simultaneously exposed views or series of views will be supposed to have been taken from substantially a single viewpoint for the purpose of securing color selection negatives from which afterward the positives or diapositives are to be made. As stated, the present invention permits the three-color system to be employed, although certain features of novelty embodied herein might be used with the two-color system which, in some cases, is sufficiently satisfactory for general practical purposes.

In exposing for the view or series of views constituting the subject, there may be color screens interposed in the path of the light rays, or in some other way a selection of the primary colors made, and in connection therewith films sensitized specially for the several colors. Thus, we may obtain red-selection negatives, and similarly green-selection negatives, and similarly blue-selection negatives. Cameras have been devised for simultaneously making such exposures, but as the same form *per se* no part of the present invention no apparatus will be shown or described herein adapted for obtaining the negatives. It will be assumed that we have the proper color-selection negatives and, commencing with that point, I will now describe the preferred procedure for securing the finished color motion picture films or color photographs.

I will not only assume the three-color system of color photography, but also that the final picture is to be a composite one, composed of the secondary colors or those complementary to the primary colors first mentioned. Thus, from the red-selection negative I will preferably make a blue-green positive image and from the green-selection negative a red or magenta image and combine or blend these with a yellow image made from the blue-selection negative. The exact colors to be used may vary considerably, and when I say red I mean any of the suitable reds or pinks, and when I say blue-green I include anything between blue and green which may be described as blue-to-green.

In the preferred embodiment of the present improvement all of the three differently colored monochrome images are combined by producing them successively in the same identical layer of material. I will refer to this layer as constituted of colloid, and in using that term I intend to include gelatin or any other material which will serve the purpose of receiving and retaining the several images.

*Formation of first image.*—The first image, as will be seen, should be formed by a different process, that is on different principles, from the subsequent images, although by photographic methods, from one of the color selection negatives. It is to be of such character as not to interfere with the formation of the subsequent images, and the process of forming the first image should not cause the partial removal, destruction, or alteration of the colloid layer. Moreover, the first image should be of such character as not to be impaired by the formation of the subsequent images. It should be insoluble and incapable of conversion or diffusion. Therefore, I form the first image of insoluble color matter, that is to say, something which, like a so-called pigment, is contrary in its character to a water soluble dye. Preferably I first make an ordinary black and white silver print within the gelatin layer, which is understood, of course, to be carried upon a suitable carrying base such as transparent celluloid. I may then convert this silver image into a color print. This may be done, if the red selection negative has been employed, by treatment with potassium ferricyanid, and then, after washing, by treatment with a dilute solution of ferric chlorid, followed, if desired, by clearing with sodium thiosulfate. A blue image results. This conversion could be effected by other known formulæ, or the first insoluble image might be otherwise produced, for example, by the ordinary ferricyanotype process, so long as the above specified requirements are met.

*Formation of second image.*—The second image is to be formed by a different process from the first image which manifestly could not be repeated in the same gelatin layer. The formation of the second image should not, however, alter the thickness of the gelatin or otherwise impair the first image, nor stand in the way of the proper formation of the third image. These requirements are met by the following preferred process of forming the second image. I sensitize the colloid layer with bichromate and thereafter expose or print the same photographically, which may be done either under the second negative or under a diapositive produced therefrom, followed by immersion in the proper color of dye so as to cause the selective absorption of color into the gelatin in accordance with the negative. A suitable image results, and this result is obtained without the dissolving away or the removal of any of the gelatin. The process may be accompanied or followed by the step of fixing or mordanting the color. If the first image has been formed of blue-to-green color, I prefer that the second image should be magenta or some equivalent color in the red order and the green-selection negative will be used. When the exposure is effected under the negative, the colloid layer will be immersed in water for removing the free bichromate without dissolving the gelatin, and thereafter immersed in an aqueous solution of magenta dye. Eosin red may be used and this becomes mordanted by the chrome compound formed by exposure to light. After sufficient dyeing the unmordanted dye is washed out, thus leaving the desired image. If the exposure is effected under a diapositive the colloid layer as before, will be immersed in water to dissolve out the bichromate and then the softened gelatin will be immersed for a very brief period, for example, one or two minutes in an acid solution of fast red. In this case there will be no subsequent washing out of dye.

*Formation of third image.*—The third image will be formed by a different process from the preceding ones and by the use of the third negative. My preferred process for the third image is to preform the image in a photographically prepared temporary dye carrier and then transfer the image by imbibition to the colloid layer containing the first and second images. Also I prefer the third image to be of yellow color for reasons to be explained. For example, I may proceed from the blue-selection negative by photographically exposing a sensitive colloid member beneath the negative and dissolving out the unaffected colloid, thus giving a colloid relief, which may be immersed in a yellow dye bath to take up dye, and thereafter applied face to face against the colloid layer containing the blue and red colors. The details of the method of imbibition from a prepared colloid relief have been set forth in patents heretofore issued to me and will not be further described. This process of introducing the third or yellow color is quick in point of time and is effective so that it has no tendency to interfere with or blur the second or selectively absorbed image, which has, in fact, been mordanted or fixed, as already described. It is true that the method of transfer by imbibition is not the ideal method for insuring accuracy and sharpness of outline, and this process would be unsuitable for any but the final step, and unsuitable for any but the yellow color. The yellow color is obviously less prominent than the blue and the red. Even for motion picture purposes an extremely critical definition would not be required for the yellow component. The fact that the introduction of the yellow imbibition image is reserved as the final step in the method precludes any subsequent impairment or diffusion of the dye image which might otherwise occur.

*Summary.*—I have thus described a complete method for producing multi-color or three-color photographs or motion picture films in which the various component steps or processes coöperate with each other by their independence of introduction and avoidance of mutual impairment, and by the ability of the three monochrome images to mutually blend without conflict so as to give clear and satisfactory multi-color pictures suitable for motion picture purposes. Thus, the insoluble image is first formed, which is important as its process is a radical chemical process which could not follow the process of introducing the subsequent colors. Indeed, the insoluble image usually requires the pre-existence of silver or other material within the emulsion or film. The insoluble image is incapable of injury by subsequent processes, as would be an image of soluble material. A repetition of the process used for the first image would not be feasible, and, therefore, the subsequent images are differently formed. The second image may not be introduced by imbibition to give entirely satisfactory results. There is sufficient diffusion in any imbibition process to render an image unsatisfactory for motion picture purposes if of a prominent color such as red. Moreover, the imbibition of a color which is to be followed by subsequent processes would result in further diffusion and inaccuracy. The selective absorption process for the second or red color satisfactorily answers the requirements. The third or final image could not be formed by the same process as either the first or second. Manifestly, the colloid could not be resensitized. Imbibition is entirely suitable for the final print, especially when yellow in color, and the use of this process does not impair the previously formed images.

I desire to claim not only the three-color process described, both broadly and specifically, but also the sub-combination consisting of the described processes for introducing the second and third colors irrespective of whether there has been a previous color; and I also claim as new the product or products hereinabove described.

It will thus be seen that I have described color photographs or motion picture films and method of producing the same embodying the principles of the present invention and securing the objects and advantages thereof, and further advantages will be apparent to those skilled in the art. Since many of the described matters involved in the method and product may be altered, omitted or supplemented without departing from the principles of the present invention, no limitations to such matters are intended, excepting so far as set forth in the appended claims.

What is claimed is:

1. Method of producing a three-color photograph or motion picture film from suitable color-selection negatives, consisting in successively forming within the body of a given colloid layer and in registry with each other three color images, of three different colors, and by three different processes, the final image being a dye image formed preliminarily in a photographically produced temporary dye image carrier and transferred by imbibition to the colloid layer containing the other two colors.

2. Method of producing a three-color photograph or motion picture film from suitable color-selection negatives, consisting in successively forming within the body of a given colloid layer and in registry with each other three color images, of three different colors, and by three different processes, the final image being a yellow dye image formed preliminarily in a photographically produced temporary dye image carrier and transferred by imbibition to the colloid layer containing the blue-to-green and red images.

3. Method of producing a three-color photograph or motion picture film from suitable color-selection negatives, consisting in successively forming within the body of a given colloid layer and in registry with each other three color images, of three different colors, the third image being a pre-formed dye image introduced into such colloid layer by imbibition from a temporary dye carrier after the first and second images have been otherwise formed in said colloid layer.

4. Method of producing a three-color photograph or motion picture film from suitable color-selection negatives, consisting in successively forming within the body of a given colloid layer and in registry with each other three color images, of three different colors and by three different processes, the first image formed photographically of insoluble color material, the second by sensitization of said colloid, photographic exposure thereof, and selective absorption of color, and the third image being introduced by imbibition of a pre-formed image from a photographically produced dye carrier.

5. Method of producing a three-color photograph or motion picture film from suitable color-selection negatives, consisting in successively forming within the body of a given colloid layer and in registry with each other three color images, of three different colors and by three different processes, the first image formed photographically of insoluble color material, the second by sensitization of said colloid, photographic exposure thereof, and selective absorption of color, said first two images being red and blue-to-green respectively, and the third image being introduced by imbibition of a pre-formed image of yellow color from a photographically produced dye carrier.

6. Method of producing a three-color photograph or motion picture film from suitable color-selection negatives, consisting in photographically forming within the body of a given colloid layer containing a sensitive silver salt an image of insoluble color material, by conversion of a silver image formed in the colloid into one color, subsequently forming a second image in registry with the first by sensitizing the colloid layer, exposing, and selectively absorbing a different color without dissolving away the colloid, and finally introducing a third image of a different color by preparing a temporary dye carrier from the third negative, dyeing it and causing the image so formed to be transferred by imbibition to the colloid layer in registry with the first and second images.

7. Method of producing a three-color photograph or motion picture film from suitable color-selection negatives, consisting in photographically forming within the body of a given colloid layer containing a sensitive silver salt an image of insoluble color material, by conversion of a silver image formed in the colloid into one color, subsequently forming a second image in registry with the first by sensitizing the colloid layer, exposing, and selectively absorbing a different color without dissolving away the colloid, and finally introducing a third image of a yellow color by preparing a temporary dye carrier from the third negative, dyeing it yellow and causing the image so formed to be transferred by imbibition to the colloid layer in registry with the first and second images.

8. Method of producing a three-color photograph or motion picture film from suitable color-selection negatives, consisting in photographically forming within the body or a given colloid layer containing a sensitive silver salt an image of insoluble blue-to-green material, by conversion of a silver image formed in the colloid into blue-to-green color, subsequently forming a second image in registry with the first by sensitizing the colloid layer, exposing, and selectively absorbing a red color without dissolving away the colloid, and finally introducing a third image of a yellow color by preparing a temporary dye carrier from the third negative, dyeing it yellow and causing the image so formed to be transferred by imbibition to the colloid layer in registry with the first and second images.

9. Method of producing a color photograph or motion picture film from suitable color-selection negatives, consisting in successively forming within the body of a given colloid layer and in registry with each other a plurality of color images, of different colors and by different processes, one of said images being formed by selective absorption of color after sensitization and photographic exposure of the colloid layer, and a subsequent image being introduced by imbibition of a pre-formed dye image produced in a temporary carrier.

10. Method of producing a color photograph or motion picture film from suitable color-selection negatives, consisting in successively forming within the body of a given colloid layer and in registry with each other a plurality of color images, of different colors and by different processes, the final one of said images being a yellow dye image pre-formed in a photographically produced temporary dye image carrier and transferred to said colloid layer by imbibition.

11. A three-color photograph or motion picture film comprising a single colloid layer upon a suitable carrying base, and containing commingled in said layer three blended images all of different characters and different colors.

12. A three-color photograph or motion picture film comprising a colloid layer upon a suitable carrying base, and containing in the said layer an image of insoluble color material, a selectively absorbed image of a different color, and an imbibed image of a third color.

13. A three-color photograph or motion picture film comprising a colloid layer upon a suitable carrying base, and containing in the said layer an image of insoluble blue-to-green material, a selectively absorbed red image and an imbibed image of yellow color.

14. A three-color photograph or motion picture film comprising a colloid layer upon a suitable carrying base, and containing in the said layer, an insoluble monochrome image and a selectively absorbed monochrome image, one of said images being red and the other blue-to-green and a third image of a yellow color imbibed from a dye-image-carrying member.

15. A color photograph or motion picture film comprising a colloid layer upon a suitable base, and containing in said layer a plurality of registered color images of different colors, one of said images being a selectively absorbed image and another being an imbibed image.

In testimony whereof I have affixed my signature hereto.

FREDERIC E. IVES.